United States Patent Office 3,621,617
Patented Nov. 23, 1971

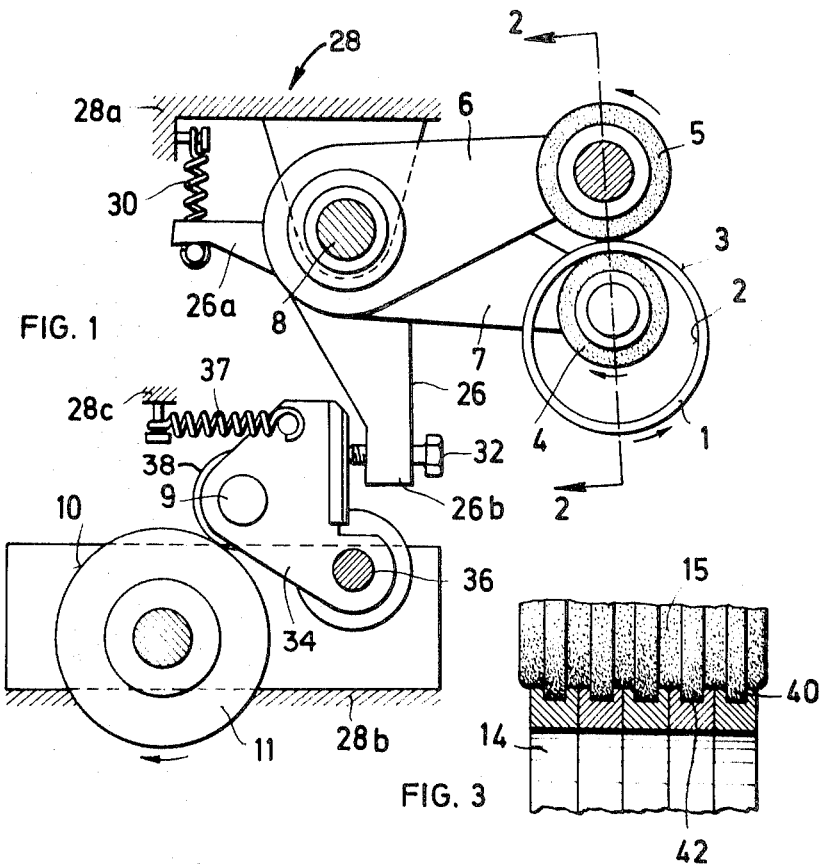
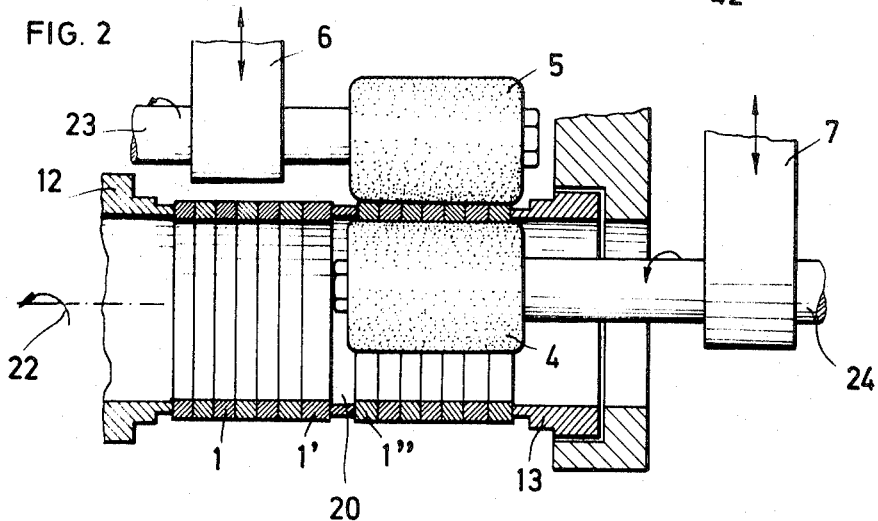

3,621,617
MACHINING APPARATUS
Theo Muller, Pattscheid, Germany, assignor to Goetzewerke Friedrich Goetz Aktiengesellschaft, Burscheid, Germany
Filed Sept. 2, 1969, Ser. No. 854,493
Claims priority, application Germany, Aug. 30, 1968, P 17 77 065.9
Int. Cl. B24b 17/02
U.S. Cl. 51—101 R
8 Claims

ABSTRACT OF THE DISCLOSURE

Apparatus is provided which can simultaneously machine the inner and outer surfaces of non-circular hollow bodies, such as piston rings, which are made with small departures from circularity. At least the inner machining tool is a rotating grinding wheel. Means are also provided to radially adjust the machining tools relative to the axis of the bodies to be ground.

BACKGROUND OF THE INVENTION

This invention relates to apparatus for machining the external and internal periphery of non-circular hollow bodies, and more particularly to such an apparatus which is capable of machining a plurality of piston rings combined into a stack with machining tools whose radial adjustment is controllable in dependence upon the desired peripheral contours of the ring.

As is well known in the piston ring art, certain rings are made with a shape which includes a small departure from true circularity. The manufacture of such rings causes manufacturing problems, since the rings must be very precisely machined to get the desired shape. However the rings because of their small axial length relative to their other dimensions, are difficult to machine. Furthermore it is necessary that any machining process used involve minimum manufacturing expense because of the large number of such rings required and competitive factors.

Machining apparatus is known which is designed to simultaneously machine a plurality of rough piston ring blanks into finished piston rings which are of non-circular shape. A number of the ring blanks are axially clamped between two planar discs to form a stack and are turned on the inside and outside with cutting tools. The radial clamping movement of the cutting tools is controlled with cams which have a peripheral contour suitable for the piston rings. The tools which cut the external surface of the ring can be mounted on a stable base. However, the mounting for the tools which cut the interior surface is more unsteady. The tools are mounted at the free end of a drilling rod clamped to the machine frame at one end.

The economical machining of such piston rings requires that a plurality of ring blanks be axially clamped together into a stack and simultaneously machined since the axial length of such rings is relatively small. A long stack of rings, however, requires a long drilling rod to hold the internal cutting tool. The drilling rod, particularly when the rings have a small diameter, is subject to substantial deformations due to the high forces generated during the cutting process. Vibrations can occur in the drilling rod which lead to inaccurate machining of the internal surface.

In recent years there has been a greater demand for piston rings made of special materials which are often hard to work. Even when high quality hard metal and ceramic materials are used for the cutting discs or other turning tools, these special materials can be worked only with substantially reduced advance movement and cutting speeds because of the extremely high cutting forces required. This leads to a decrease in the economical feasibility of the manufacturing process since it makes more difficult the machining of several rings at one time.

Among the objects of the present invention is the improvement of the cutting speeds at which piston ring materials can be machined.

A further object of the invention is the reduction of the cutting forces acting on drilling rods.

A still further object is an increase in the accuracy of the machining of the internal surface of piston rings.

Briefly stated these and other objects of the invention are achieved by providing a rotating grinding wheel which can engage the internal surface of a non-circular hollow body in apparatus which includes means for holding the hollow body, means mounting machining tools for shaping the internal and external surfaces of the hollow body, and means providing for radial adjustment of the machine tools.

BRIEF DESCRIPTION OF THE DRAWINGS

FIG. 1 is a side view illustrating schematically the arrangement of the tool holders and their control.

FIG. 2 is a sectional view on the line 2—2, with some parts broken away, showing additional details of the apparatus for holding the stack of piston rings and for mounting the grinding discs.

FIG. 3 is a fragmentary sectional view of a grinding wheel according to another embodiment of the invention grinding a stack of grooved piston rings.

DESCRIPTION OF THE PREFERRED EMBODIMENTS

Referring now to the drawings, FIG. 1 shows a stack of piston rings 1 having its inner surface 2 and outer surface 3 machined by grinding wheels 4 and 5. The grinding wheels 4 and 5 are rotated with any suitable apparatus, not shown, and may be driven separately, rotated at different speeds, or in opposite directions. The rotational speed of the wheels is substantially higher than the speed of rotation of the piston ring stack 1. Any suitable drive apparatus for the grinding wheels can be used, for example a light electric motor may be mounted on the ends of each lever 6 and 7 so as to drive shafts 23 and 24 directly. Alternatively, separate motors may be fixed on the machine frame with their rotor shafts in axial alignment with shaft 8, and connected by belts to the grinding wheel shafts 23 and 24.

As shown in FIG. 2 suitable apparatus is provided to clamp individual rings into stack 1. Holding rings 12 and 13 engage opposite ends of the ring stack while an intermediate holding ring 20 is disposed between piston ring 1' and 1" to divide the ring stack into two halves. Suitable apparatus, not shown, is provided to rotate the holding rings 12 and 13 in the direction shown by arrow 2 of FIG. 22.

In order to produce the desired non-circular periphery of the rings the grinding wheels are mounted for rearward adjustment so as to produce a rocking movement with each revolution of the piston ring stack 1. To produce this rocking movement the shaft 23 of the outer grinding wheel 5 is mounted on a lever 6 which is fixed to shaft 8 for rotation therewith. The shaft 24 of inner wheel 4 is mounted on a similar rocking lever 7 which is also mounted for rotation with shaft 8. Shaft 8 is mounted for rocking movement about a fixed axis in the machine frame 28.

A bell crank lever 26 is also fixed to shaft 8 for rotation therewith. One arm 26a of the bell crank lever is biased to frame 28 by a spring 30. The other arm 26b of the bell crank lever carries a threaded adjustment bolt 32. The tip of bolt 32 engages a rocker 34 which is mounted for rocking movement about a shaft 36 which in turn is biased in one direction by a spring 37 fixed to another part 28c of the machine frame. A roller 38 on the rocker is engaged by the peripheral surface 10 of a cam disc 11 mounted for rotation on portion 28b of the machine frame. The peripheral surface 10 has a curved shape corresponding to that desired for the non-circular shape of the piston rings. The disc 11 is driven by suitable apparatus, not shown, and rotates at the same speed as the stack of rings 1.

The apparatus of the present invention is, except for modifications to provide grinding wheels in place of conventional cutting tools, in general similar to that disclosed in German Pat. No. 932,215.

In order to provide separate radial adjustment of the inner and outer grinding wheels 4 and 5, separate rocker mechanisms are provided for each wheel. Each mechanism includes a shaft 8, the two shafts being in axial alignment, a bell crank lever 26, a rocker 34, and a cam disc 11. Adjustment of the bolt 32 permits compensation for differing amounts of wear on the two grinding wheels.

The inner and outer grinding wheels 4 and 5 operate according to the plunge cutting method. The grinding wheels cut continually into the piston ring stack 1 in radial direction under the influence of spring 30 until further inward movement is restricted by the cam disc 11.

As disclosed in FIG. 3 the grinding discs may have an outer profile including raised grinding portions 40 which cut corresponding grooves 42 into the outer surface of the ring. By provision of a suitable grinding wheel many different desired features can be formed on the outer surface of the piston ring, for example, chamfers or oil grooves.

By reference to FIG. 2 it will be appreciated that the grinding surface of wheel 5 has an axial length which is an approximately integral number of the axial length of the piston rings. In the illustration shown, this axial length is equal to the length of approximately seven piston rings. By providing grinding wheels which have an integral relationship to the length of piston rings, it is possible to grind any number of piston rings in succession. If the integral relationship of wheels to rings were 1:1, one ring after another could be successively ground. In the case illustrated in which the relationship is 7:1, groups of seven rings can be ground one after another. It will also be noted that the piston ring stack has a similar integral relationship to the axial length of the grinding wheel 4. The length of the grinding wheel 4 corresponds to the length of the piston ring stack or to a whole number fraction of the same. Thus, all rings clamped in the stack or a certain number thereof can be simultaneously worked by a single insertion, or successive insertions of shaft 24.

Since the speed of rotation of the individual grinding element particles in the surfaces of the grinding wheels can be regulated within wide limits, and in addition, to the normal speed of rotation of the piston ring surface, it is possible to realize much higher cutting speeds without having to increase the cutting power. This permits correspondingly faster advance movement. Moreover, direct grinding of the peripheral surfaces also eliminates finishing grinding operations which might have been necessary with other working processes.

To produce different surface qualities the grinding wheels for the internal and external surfaces can be driven at different speeds. It is also possible to employ grinding wheels with different coarsenesses and different grinding elements. By providing separate adjustment features for each grinding wheel it is possible to separately control the aligning movement. This is helpful for compensating for grinding wheel wear, which will usually be different for each wheel.

It will be understood that the above description of the present invention is susceptible to various modifications, changes and adaptations.

I claim:
1. Apparatus for grinding peripheral surfaces of non-circular hollow bodies comprising, in combination:
   (a) support means;
   (b) means mounted on the support means for holding a non-circular hollow body to be ground which body has an axis and inner and outer surfaces;
   (c) a pair of grinding wheels, mounted on the support means with one grinding wheel positioned against the inner surface and the other positioned against the outer surface of the hollow body;
   (d) means for producing relative radial movement between the grinding wheels and the hollow body mounted on said support means; and
   (e) means for radially adjusting the positions of the grinding wheels relative to the axis of said body.

2. The apparatus of claim 1 including means for driving the grinding wheels of said pair at respectively different speeds.

3. The apparatus of claim 1 including means for separately adjusting the position of each grinding wheel of said pair.

4. The apparatus of claim 1 wherein said holding means includes means for holding a plurality of unslit piston rings in a stack in which the rings are aligned in axial engagement.

5. The apparatus of claim 4 in which each wheel of said pair has a predetermined axial length and said holding means is shaped to hold a stack of rings having an axial length which is an integral ratio of the axial length of each of said grinding wheels.

6. The apparatus of claim 1 in which the hollow body comprises a piston ring having an axial length and each wheel of said pair has a grinding surface of predetermined axial length the axial length of the grinding surface of each of said wheels is an integral number of the axial length of the piston ring.

7. The apparatus of claim 1 wherein one of said grinding wheels has an outer periphery, which in radial section is non-linear and corresponds to a non-linear periphery desired on a radial section of the hollow body.

8. The apparatus of claim 1 wherein said means for producing relative radial movement comprises;
   (a) cam means mounted for rotation on said support means;
   (b) cam follower means pivotally mounted on said support means so that said cam follower means engages said cam means;
   (c) lever means mounting said grinding wheels to said support means; and
   (d) means engaging said cam follower means for transferring the movements of said cam follower means when engaged with said cam means to said grinding wheels through said lever means, said means for radially adjusting being mounted to said means engaging said cam follower means.

References Cited

UNITED STATES PATENTS

| | | | |
|---|---|---|---|
| 635,777 | 10/1899 | Howe | 51—89 |
| 2,334,938 | 11/1943 | Lang | 51—101 |
| 2,421,548 | 6/1947 | Davies | 51—101 |
| 2,445,971 | 7/1948 | Rosen | 51—101 |
| 2,807,916 | 10/1957 | Squire et al. | 51—88 |
| 2,909,009 | 10/1959 | Schmidt et al. | 51—88 |

FOREIGN PATENTS

| | | | |
|---|---|---|---|
| 784,293 | 10/1957 | Great Britain | 82—19 |
| 932,215 | 8/1955 | Germany | 82—19 |

LESTER M. SWINGLE, Primary Examiner

U.S. Cl. X.R.

51—89; 82—19

UNITED STATES PATENT OFFICE
CERTIFICATE OF CORRECTION

Patent No. 3,621,617     Dated November 23rd, 1971

Inventor(s) Theo Müller

It is certified that error appears in the above-identified patent and that said Letters Patent are hereby corrected as shown below:

Column 1, line 4, change "Goetz" to --Goetze--.
Column 2, line 53, change "2" to --22--; line 54, change "22" to --2--.

Signed and sealed this 13th day of June 1972.

(SEAL)
Attest:

EDWARD M. FLETCHER, JR.
Attesting Officer

ROBERT GOTTSCHALK
Commissioner of Patents